United States Patent [19]
Wright et al.

[11] Patent Number: 5,170,475
[45] Date of Patent: Dec. 8, 1992

[54] DATA PROCESSOR HAVING INSTRUCTIONS FOR INTERPOLATING BETWEEN MEMORY-RESIDENT DATA VALUES RESPECTIVELY

[75] Inventors: C. David Wright, Mt. Clemens, Mich.; John P. Dunn; John Vaglica, both of Austin, Tex.

[73] Assignees: Motorola, Inc., Schaumburg, Ill.; General Motors Corp., Detroit, Mich.

[21] Appl. No.: 319,003

[22] Filed: Mar. 6, 1989

[51] Int. Cl.$^5$ .......................................... G06F 15/353
[52] U.S. Cl. ............................ 395/375; 364/DIG. 1; 364/258; 364/723; 364/258.4
[58] Field of Search ... 395/375; 364/732, 200 MS File, 364/900 MS File

[56] References Cited

U.S. PATENT DOCUMENTS

| | | | |
|---|---|---|---|
| 3,725,794 | 4/1973 | Asplund | 328/129 |
| 3,748,447 | 7/1973 | Hajicek et al. | 364/723 |
| 4,001,565 | 1/1977 | Kawai | 364/723 |
| 4,313,173 | 1/1982 | Candy et al. | 364/723 |
| 4,338,675 | 7/1982 | Palmer et al. | 364/200 |
| 4,402,012 | 8/1983 | Knight | 358/160 |
| 4,901,266 | 2/1990 | Takagi | 364/723 |
| 5,020,014 | 5/1991 | Miller et al. | 364/723 |

Primary Examiner—Thomas C. Lee
Assistant Examiner—L. Donaghue
Attorney, Agent, or Firm—Jonathan P. Meyer

[57] ABSTRACT

A data processor executes a table look-up and interpolate instruction which retrieves two adjacent table values from memory, interpolates between them and stores the result in a register. The same register contains, prior to the execution of the instruction, a value which is used both in calculating the address in memory from which the values are obtained and in performing the interpolation calculation. A major variant of the instruction involves obtaining the values to be interpolated between from registers, rather than from a table in memory. The combination of the two facilitates the performance of three-dimensional, or surface interpolations. It is also possible to select whether rounding is performed during the interpolation.

14 Claims, 5 Drawing Sheets

FIG.3

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 1 | 1 | \multicolumn{3}{c} Cp-ID | | | 0 | 0 | 0 | \multicolumn{3}{c} EFFECTIVE MODE | | | \multicolumn{3}{c} ADDRESS REGISTER | | |
| 0 | \multicolumn{3}{c} REGISTER Dx | | | 0 | R | 0 | 1 | \multicolumn{2}{c} SIZE | | 0 | 0 | 0 | 0 | 0 | 0 |

*FIG.4A*

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 1 | 1 | \multicolumn{3}{c} Cp-ID | | | 0 | 0 | 0 | 0 | 0 | 0 | \multicolumn{3}{c} REGISTER Dym | | |
| 0 | \multicolumn{3}{c} REGISTER Dx | | | 0 | R | 0 | 0 | \multicolumn{2}{c} SIZE | | 0 | 0 | 0 | \multicolumn{3}{c} REGISTER Dyn | | |

*FIG.4B*

DATA PROCESSOR HAVING INSTRUCTIONS FOR INTERPOLATING BETWEEN MEMORY-RESIDENT DATA VALUES RESPECTIVELY

FIELD OF THE INVENTION

The present invention relates, in general, to a data processor capable of executing, by means of a single instruction, a table look-up and interpolate function. More particularly, the invention relates to an integrated circuit data processor which includes a table look-up and interpolate instruction in its instruction set.

BACKGROUND OF THE INVENTION

Many common applications of data processors which involve controlling a mechanical system involve table look-up operations. An example is the use of a microprocessor to generate signals used for controlling the fuel injectors in an internal combustion engine. The microprocessor is provided with a number of input parameters, such as engine speed, load, intake air temperature and pressure, calculates the appropriate amount of fuel to be injected and the timing for the injection and generates control signals which actuate the injectors. It is well known that a very effective method of performing the necessary calculations is to use the input parameters to generate an address which points to a location in a previously calculated table and to retrieve the appropriate results from that location in the table, which is stored in a memory accessible to the microprocessor.

Interpolation is a well known technique for increasing the accuracy of information retrieved from a table without requiring a larger table. Interpolation has been widely applied to data processor-based control systems such as that described above.

In the field of integrated circuit data processors, also referred to as microprocessors or microcomputers, table look-up and interpolation operations have been performed through a sequence of more basic instructions which are executable by the processors. While this solution allows the system designer wide flexibility in developing the most appropriate table look-up and interpolation algorithm for a particular application, such sequences of instructions are always slower than an equivalent single instruction would be. In addition, designing, coding and maintaining the algorithm may represent a significant burden on the resources of the system designer.

SUMMARY OF THE INVENTION

Accordingly, it is an object of the present invention to provide an improved data processor with a table look-up and interpolate instruction.

This and other objects and advantages of the present invention are provided by a data processor comprising: instruction execution means for executing each of a plurality of instructions; memory interface means coupled to the instruction execution means for providing to the data processor information stored in a memory; and register means coupled to the instruction execution means for storing and providing information; wherein the instruction execution means further comprises: means for responding to the execution of a first particular one of said plurality of instructions by operating the memory interface means to provide a first unit of information, by operating the memory interface to provide a second unit of information, by performing an interpolation operation upon the first and second units of information and by providing an output.

These and other aspects of the present invention will be more apparent from the detailed description below taken together with the drawings.

BRIEF DESCRIPTION OF THE DRAWINGS

FIG. 3 is a diagram illustrating the register set, or programmer's model, of the central processing unit of the apparatus of FIG. 1;

FIGS. 4A and 4B are diagrams illustrating, respectively, the instruction formats of first and second variants of the table look-up and interpolate instruction executable by the apparatus of FIGS. 1 and 2;

DETAILED DESCRIPTION OF THE INVENTION

Figure 1:
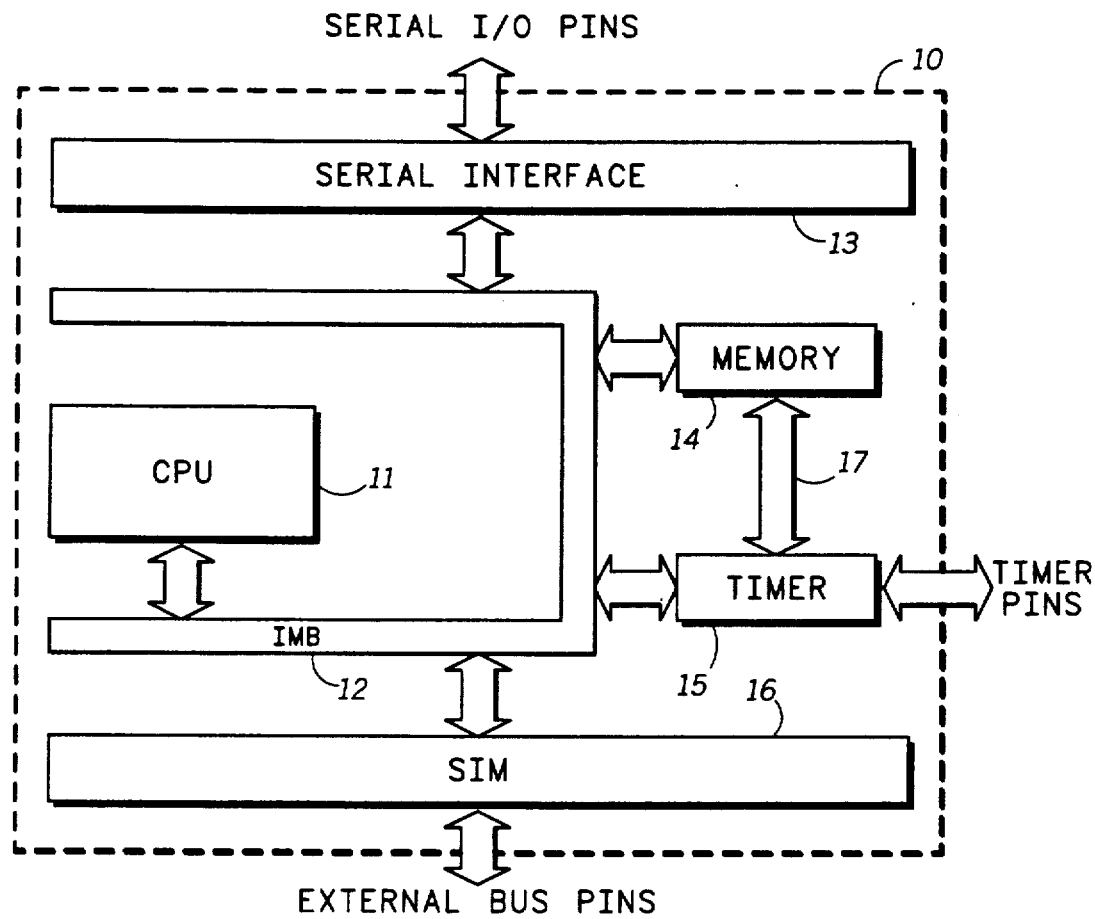
FIG. 1 is a block diagram illustrating an integrated circuit data processor according to a preferred embodiment of the present invention.

FIG. 1 illustrates an integrated circuit data processor according to a particular embodiment of the present invention. A microcomputer 10 comprises a central processing unit (CPU) 11, an inter-module bus (IMB) 12, a serial communication interface 13, on-board memory 14, a timer module 15 and a system integration module (SIM) 16. Inter-module bus 12, which comprises multiple data, address and control signal lines, is coupled to and provides for communication between each of the other components of microcomputer 10. Serial interface 13 provides for synchronous and/or asynchronous serial data transfer between microcomputer 10 and external devices and systems by means of several serial I/O pins. Memory 14 provides storage space for software instructions and other data useful to microcomputer 10. Timer module 15 provides various timing functions such as input capture, output compare and the like by means of several timer pins and is coupled to memory 14 by means of an interface 17. SIM 16 provides an interface between IMB 12 and an external bus for purposes of providing CPU 11 access to external memories and other peripherals and also provides certain system functions such as clock signal generation and distribution.

Figure 2:
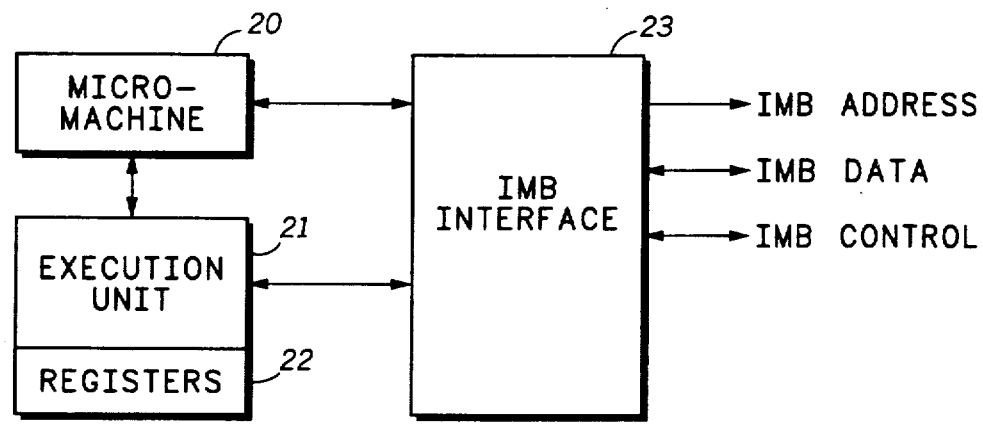
FIG. 2 is a block diagram illustrating the central processing unit of the apparatus of FIG. 1.

FIG. 2 illustrates, in simplified form, the internal structure of CPU 11 of FIG. 1. Fundamentally, CPU 11 comprises a micro-machine 20, an execution unit 21, a set 22 of registers and a bus interface 23. Micro-machine 20 is coupled bi-directionally to interface 23 and to execution unit 21. Registers 22 and execution unit 21 are coupled to one another by means of internal buses and the like which are not illustrated here. Execution unit 21 is also bi-directionally coupled to interface 23. Interface 23 is coupled to the address, data and control signals which comprise IMB 12.

Micro-machine 20 is responsible for determining the sequence in which instructions are to be executed, receiving the instructions from interface 23 after they have been fetched from memory (either memory module 14 or external memory), instructing interface 23 to perform instruction fetches and operand read or write cycles and decoding instructions into a plurality of control signals for use in controlling execution unit 21. As a portion of the instruction sequencing function of micro-machine 20, it performs exception processing, including the function of determining whether to acknowledge interrupt requests received via interface 23 from IMB 12. Execution unit 22 is responsible for the actual execution of the logical, arithmetic and other functions encoded in the instructions received by micro-machine 20. Registers 22 store various inputs to and results of the operations of execution unit 21. IMB interface 23 is a master-only interface to IMB 12. That is, it can initiate read and write cycles of IMB 12, and it can permit another master to initiate such cycles, but it cannot respond to either a read or a write cycle of IMB 12 which is initiated by another bus master.

Figure 3:
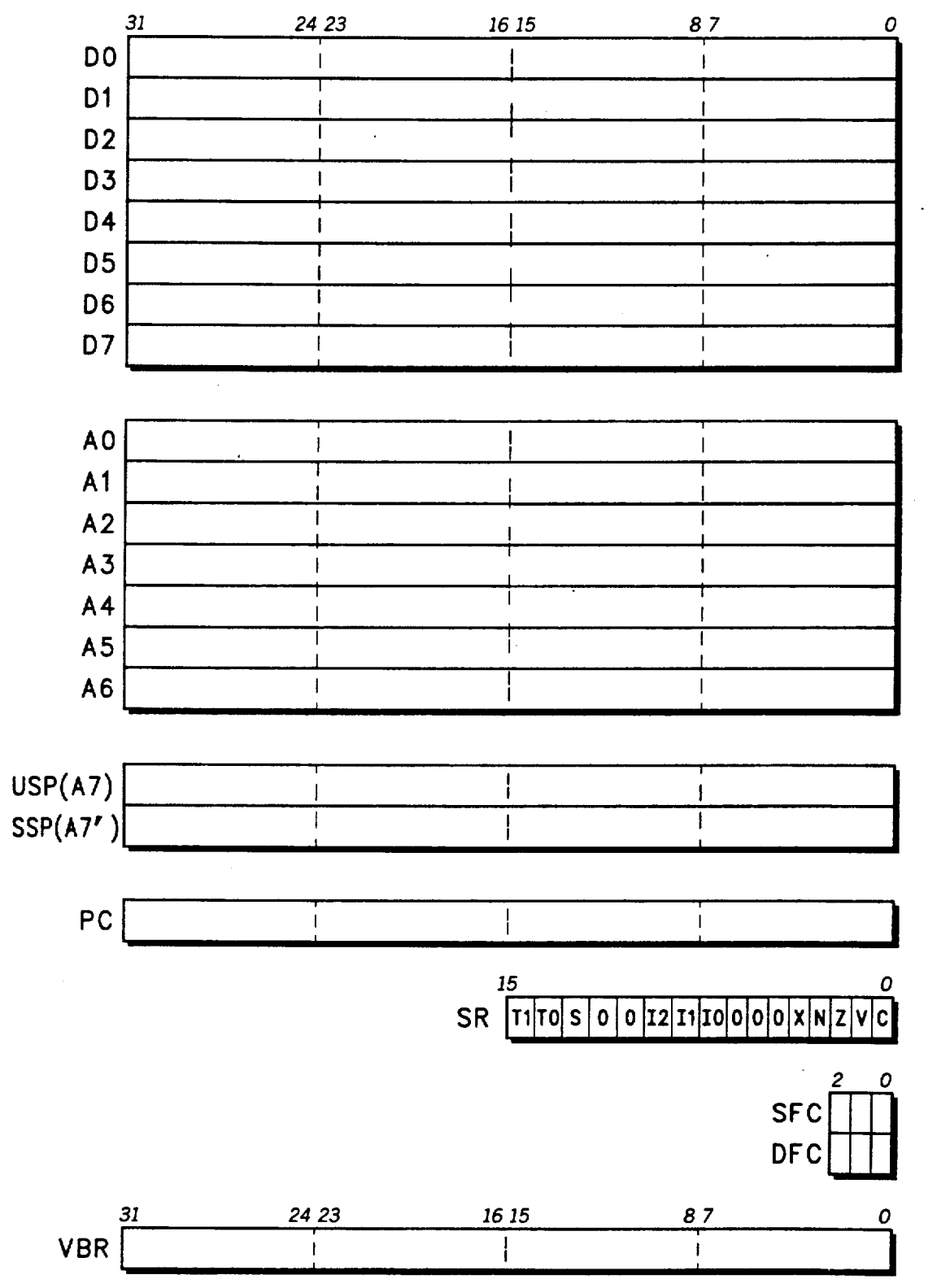

Referring now to FIG. 3, register 22 of FIG. 2 are illustrated in greater detail. Registers 22 comprise 8 32-bit data registers, designated D0-D7; 7 32-bit address registers, designated A0-A6; 2 stack pointers, designated USP (for user stack pointer) and SSP (for supervisor stack pointer), respectively; a single 32-bit program counter, designated PC; a single 16-bit status register, designated SR; 2 3-bit function code registers, designated SFC (for source function code) and DFC (for destination function code), respectively; and a single 32-bit vector base register, designated VBR. The two stack pointers are alternately referred to with the designations A7 and A7', respectively.

Together, registers 22 comprise what is referred to as the programmer's model of CPU 11. The programmer's model illustrated here will be familiar to any user of microprocessors of the 68000-family of microprocessors available from Motorola, Inc. of Austin Texas.

In addition to the registers illustrated in FIG. 3, CPU 11 includes two temporary registers, referred to as temp1 and temp2, respectively. These registers are not a portion of the programmer's model because they cannot be accessed by the user through any of the instructions executable by CPU 11 (except for certain instructions available only in a debugging mode which is not relevant to the present invention). Various instructions executed by CPU 11 do use temp1 and temp2 for the storage of intermediate results, however, as is discussed more fully below.

As is true of virtually any data processor, CPU 11 is capable of executing a fixed set of instructions. The object code representation of each instruction, that which is actually fetched from memory and executed by CPU 11, is a string of bits. Each instruction executable by CPU 11 comprises a predetermined number of bits. In many instances, the instructions comprise 32 bits, not including extension words such as immediate data. FIG. 4A illustrates the object code format of one of the instructions executable by CPU 11. The instruction format is illustrated as two 16 bit words, since IMB 12 transfers at most 16 bits at a time. The first word of the instruction 30 comprises 5 bit fields. The bit field comprising bits 12-15 is all 1's. The bit field comprising bits 9-11 identifies which processor in a multi-processor system is to execute this instruction. If CPU 11 is to execute the instruction, this bit field will contain the bits 100. The bit field comprising bits 6-8 is all 0's. The bit field comprising bits 3-5 identifies the effective addressing mode to be used in executing this instruction. The bit field comprising bits 0-2 identifies which of the seven address registers is to be used to calculate the effective address for this instruction.

The second word of this instruction 31 comprises 7 bit fields. Bit 15 is 0. The bit field comprising bits 12-14 identifies which of the eight data registers, referred to as Dx, is to be used in executing the instruction. As is described in greater detail below, this data register is both the source of an operand and the destination of the result of this instruction. Bit 11 is 0. Bit 10 is a rounding flag and is used to determine whether the result of the interpolation operation is rounded or not. The bit field comprising bits 8-9 contains the bit pattern 01. The bit field comprising bits 6-7 identifies whether the instruction is to be carried out using byte (8 bits), word (16 bits) or long word (32 bits) operands. This bit field specifies the size both of the individual entries in the table and of the result of the interpolation operation. Finally, the bit field comprising bits 0-5 is all 0's.

When CPU 11 encounters and instruction of the format illustrated in FIG. 4B, it performs a table look-up and interpolate operation. The details of the execution of this instruction are described with reference to FIG. 5A. FIG. 4A illustrates the object code representation of the instruction. In assembly language the representation of this instruction has two basic variants:

| TABLE. <size> | <ea>, Dx; and |
|---|---|
| TABLENR. <size> | <ea>, Dx. |

The former refers to the rounding variant of the instruction and the latter refers to the non-rounding variant. In each case, the <size> argument would be B, W or L (for byte, word or long word), the <ea> argument would represent both the addressing mode and the address register and the Dx argument would identify the data register. As is well known, software known as an assembler converts the assembly language representation of an instruction into the object code representation which is executable by the processor.

FIG. 4B illustrates the object code format of another instruction executable by CPU 11. This instruction is quite similar to the instruction illustrated in FIG. 4A, so only the differences will be described. The first word of the instruction 32, comprises one less bit field than the first word of the instruction of FIG. 4A. The effective address field, bits 3-5, are all 0's. The field comprising bits 0-2, instead of being used to identify an address register, is used to identify a data register referred to as Dym. As is described in greater detail below, this data register is the source of an operand of this instruction. The second word 33 differs from the second word of the instruction of FIG. 4A only in bit 8 and the least significant 3 bits. Bit 8 of the second word 33 is 0, rather than 1. Also, the bit field comprising the least significant 3 bits identifies a data register referred to as Dyn, which is also the source of an operand for this instruction. In assembly language, the representation of the instruction of FIG. 4B has two basic variants:

| TABLE. <size> | Dym: Dyn, Dx; and |
|---|---|
| TABLENR. <size> | Dym: Dyn, Dx. |

Figure 5:
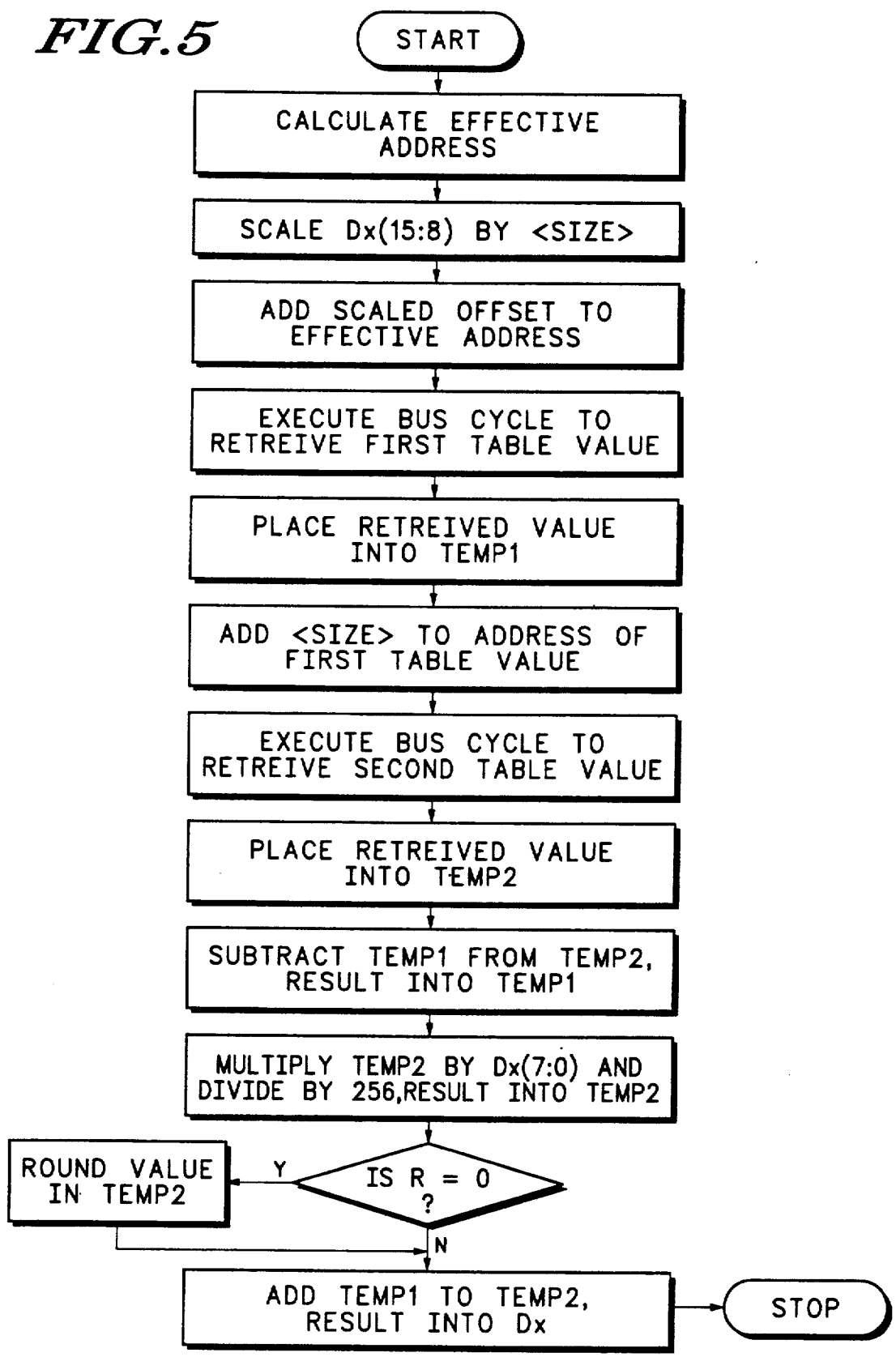
FIG. 5 is a flowchart illustrating the steps executed by the apparatus of FIGS. 1 and 2 in executing the instruction of FIG. 4A.

FIG. 5 illustrates the steps carried out by CPU 11 in executing the instruction of FIG. 4A. In summary, this instruction looks up two adjacent values from a table of signed byte, word or long word values which is assumed to have been previously stored in memory. The table may reside either in memory 14 or in an external memory. The table is assumed to start at a location specified by an address calculated from the specified address register using the effective address mode specified. The address of the first value which is looked up is derived by using bits 8-15 of the operand in the specified data register as an offset from the table start address. The address of the second value is derived by simply incrementing the address of the first value, with the incrementing being sensitive to the size field of the instruction. Once the two table values are retrieved from memory, a linear interpolation is performed using the lower byte (bits 0-7) of the operand in the specified data register in the calculation of the interpolated result. During the interpolation calculation, an intermediate result is either rounded or not, as is determined by the R bit in the instruction. The result of the interpolation operation is placed into the data register specified in the instruction.

The execution of the instruction of FIG. 4A is begun by calculating an effective address. This is a well known operation in the data processing art. The effective addressing modes available in the preferred embodiment are: address register indirect, address register indirect with displacement, address register indirect with index, absolute short, absolute long, PC with displacement, and PC with index. The effective address points to a location in memory at which a table is assumed to start. Next, the offset into the table is calculated by scaling bits 8-15 of the contents of Dx by <size>. In other words, bits 8-15 of Dx is assumed to contain the number of the table entry from which the first value is to be retrieved. The actual offset, in terms of a memory address, must be calculated from this number by multiplying it by the <size> parameter, which indicates how many memory locations each table entry occupies.

Next, the memory address of the first table entry to be retrieved is calculated by adding the offset to the effective address. Next, the bus interface (23 of FIG. 2) is instructed to execute an operand read cycle of the appropriate size using the address just calculated. The results of this bus cycle, when it is completed, are placed into temp1, the intermediate result register mentioned above. Next, the address of the second table entry to be retrieved is calculated by adding the <size> parameter to the address of the first table entry. The bus interface is again instructed to perform an operand read cycle using this new address and the results of the cycle are placed in to temp2.

The next three steps perform the actual interpolation operation. First, the value of temp1 is subtracted from the value of temp2 and the result is placed into temp2. Next, the value in temp2 is multiplied by an interpolation fraction calculated by dividing the lower byte of Dx by 256. Since the lower byte of Dx comprises 8 binary digits, it is capable of representing decimal numbers in the range of 0 to 255, thus the calculation of the interpolation fraction is as mentioned. The result of this operation is placed into temp2 and is referred to as an adjusted difference. Next, this intermediate result is either rounded or not, depending on the state of the R bit. If the R bit is 0, then rounding is performed as follows. If the fractional part of the adjusted difference is less than or equal to $-\frac{1}{2}$ (in decimal notation) then 1 is subtracted from the adjusted difference and the integer part is taken as the rounded, adjusted difference. If the fractional part of the adjusted difference is greater than $-\frac{1}{2}$ and less than $+\frac{1}{2}$, then the integer part is taken as the rounded, adjusted difference. If the fractional part of the adjusted difference is greater than or equal to $+\frac{1}{2}$, then 1 is added to the adjusted difference and the integer part is taken as the rounded, adjusted difference. Finally, the value of temp1 is added to the value in temp2 and the result is placed into Dx. This will be recognized as a standard linear interpolation operation. Of course, any other interpolation operation might easily be substituted where appropriate.

For rounded (integer) results, the result is the same size as the operands, i.e., that specified by the <size> parameter, and is placed into Dx in right justified fashion. The upper bits of Dx, assuming a size of byte or word, are not affected. For unrounded results, the lower byte of Dx contains the fractional portion of the result, regardless of the <size> parameter. The remaining portion of Dx contains the result, with byte and word results being sign-extended to fill Dx.

Figure 6:
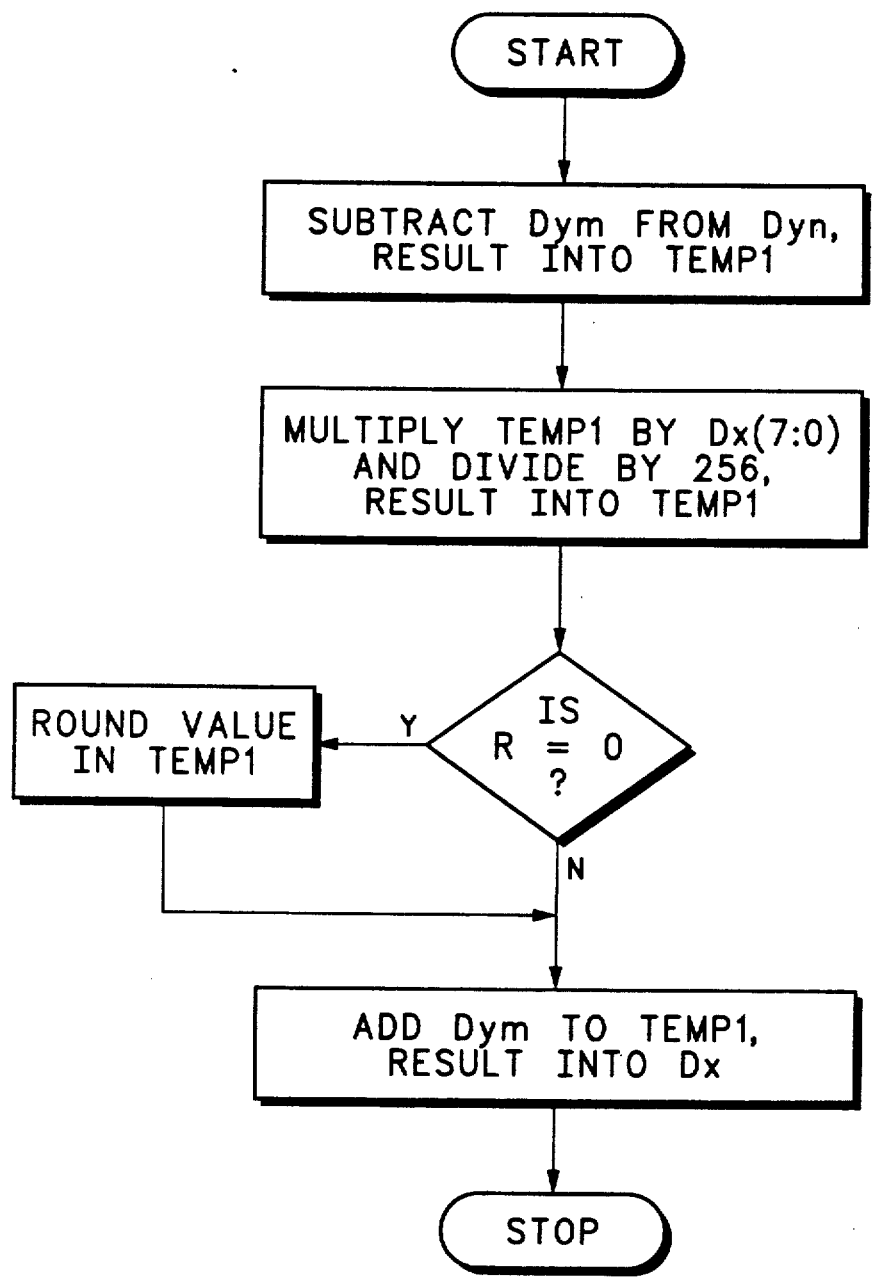
FIG. 6 is a flowchart illustrating the steps executed by the apparatus of FIGS. 1 and 2 in executing the instruction of FIG. 4B.

Referring now to FIG. 6, the steps carried out by CPU 11 in executing the instruction of FIG. 4B are illustrated. In summary, this instruction obtains the values to be interpolated from registers specified within the instruction rather than from a table in memory. This instruction is useful for performing three-dimensional, or surface look-up and interpolation operation. In other words, two previous executions of the instruction of FIG. 4A will have placed interpolated results into data registers. Then an instance of the instruction of FIG. 4B can be used to interpolate between these two results. The register specified by the Dym field of the instruction is the source of the first value and the register specified by the Dyn field is the source of the second value. Otherwise, the execution of this instruction is identical to that of FIG. 4A.

In addition to altering Dx, both of the instructions discussed above may alter several of the condition code bits (X, N, Z, V and C) of the status register. Both do so in the same manner. X (extend) is never affected. C (carry) is always cleared. N (negative) is set if the most significant bit of the result is set and is cleared otherwise. Z (zero) is set if the result is 0 and is cleared otherwise. V (overflow) is set if the integer portion of an unrounded long word result is not in range of $-2^{23}$ to $2^{23}$ and is cleared otherwise.

The use of the contents of Dx in the manner described implies several limitations of the instructions. Since both of the fields of Dx are one byte long, both have maximum decimal values of 255. Therefore, any table may have, at most, 257 entries and the maximum resolution of the interpolation operation is 1/256 of the distance between two successive table entries. This suggests that one might modify these features of the disclosed embodiment in appropriate circumstances. For instance, if the data processing system designer anticipates primarily applications involving tables with relatively few data points and in which a high degree of interpolation resolution would be useful, it would be appropriate to use more bits of the operand for calculating the interpolation fraction and fewer for calculating the table offset. Obviously, the converse is true if one anticipates primarily applications involving tables with many entries and can tolerate lower interpolation resolution. One might even include a variable bit field in the instruction which specifies how many bits are to used for each purpose in order to maximize flexibility. Another apparent modification involves the use, in the described embodiment, of only the lower 16 bits of the Dx register. Of course, it is possible to use more or less than this number of bits of Dx, as appropriate. In addition, in other embodiments, the size of Dx itself might be other than 32 bits. Yet another possible modification is to allow the number of bits of Dx which are used for the two functions (calculating the offset and performing the interpolation calculation) to be specified by data stored in the table itself. This would allow both the number of table entries and the interpolation resolution to be variable from table to table without having to add bit fields to the instruction itself.

For purposes of clarity, the above description refers to the existence to two distinct instructions. In it would be just as accurate to refer to the two instructions as a single instruction with the option of obtaining the interpolation values from memory or from registers. On the other hand, it would also be accurate to describe the existence of a large number of related instructions, since the permutations of the addressing modes, rounding flag settings and other variables produces many distinct object code bit patterns.

These and other modifications to the described embodiment will be apparent to one of skill in the art and are within the spirit and scope of the present invention.

We claim:

1. A data processor comprising:
    instruction execution means for executing each of a plurality of instructions;
    memory interface means coupled to the instruction execution means for providing to the data processor information stored in a memory; and
    register means coupled to the instruction execution means for storing and providing information;
    wherein the instruction execution means further comprises:
    first means for responding to the execution of a first particular one of said plurality of instructions by operating the memory interface means to provide a first unit of information, by operating the memory interface means to provide a second unit of information, by performing an interpolation operation upon the first and second units of information and by providing a first output; and
    second means for responding to the execution of a second particular one of said plurality of instructions by operating the register means to provide a user input of the first unit of information without operating said memory interface means to access said memory, by operating the register means to provide a user input of the second unit of information without operating said memory interface means to access said memory, by performing the interpolation operation upon the first and second units of information and by providing a second output.

2. The data processor according to claim 1 wherein the instruction execution means further comprises:
    rounding means for responding to the execution of said first particular one of said plurality of instructions by selectively performing a rounding operation during said interpolation operation, said selective rounding being controlled by a rounding portion of said first particular one of said plurality of instructions.

3. The data processor according to claim 1 wherein the instruction execution means further comprises;
    rounding means for responding to the execution of said first and second particular ones of said plurality of instructions by selectively performing a rounding operation during said interpolation operation, said selective rounding being controlled by a rounding portion of said first and second particular ones of said plurality of instructions.

4. The data processor according to claim 1 further comprising:
    address calculation means coupled to the memory interface means responsive to an effective address portion of said first particular one of said plurality of instructions for calculating an address, by operating the register means to provide a third unit of information, by calculating an address of said first unit of information by adding a scaled first portion of said third unit of information to said address, wherein the scaled first portion is calculated according to an operand size specified in the first particular one of said plurality of instructions.

5. The data processor according to claim 4 wherein the instruction execution means further comprises:
    means for calculating a difference between the first and second units of information;
    means for calculating from a second portion of the third unit of information an interpolation fraction;
    means for calculating a product of the difference between the first and second units of information and the interpolation fraction; and
    means for calculating a sum of the first unit of information and the product of the difference between the first and second units of information and the interpolation fraction.

6. A data processor comprising:
    instruction decoding means for decoding each of a plurality of instructions and for producing a plurality of control signals;
    register means coupled to the instruction decoding means and responsive to control signals to store and provide information;
    interface means coupled to the instruction decoding means and responsive to control signals for providing to the data processor information stored in an information storage means; and
    computation means coupled to the instruction decoding means, register means and interface means and responsive to control signals for performing arithmetic and logical computations;
    wherein the improvement comprises:
    instruction execution means for responding to the decoding of a first particular one of said plurality of instructions by generating control signals which operate the interface means to provide a first unit of information from a first location in the information storage means, operate the interface means to provide a second unit of information from a second location in the information storage means, operate the computation means to perform an interpolation computation upon the first and second units of information and operate the register means to store a result of the interpolation computation, the instruction execution means also responding to the decoding of a second particular one of said plurality of instructions by generating control signals which operate the register means to provide a user input of a first unit of information without operating said interface means to access said storage means, operate the register means to provide a user input of a second unit of information without operating said interface means to access said storage means, operate the computation means to perform an interpolation computation upon the first and second units of information and operate the register means to store a result of the interpolation computation.

7. The data processor according to claim 6 wherein the execution means further comprises:
rounding means for responding to the execution of said first particular one of said plurality of instructions by selectively performing a rounding operation during said interpolation calculation, said selective rounding being controlled by a portion of said first particular one of said plurality of instructions.

8. The data processor according to claim 6 wherein the execution means further comprises:
rounding means for responding to the execution of said first and second particular ones of said plurality of instructions by selectively performing a rounding operation during said interpolation calculation, said selective rounding being controlled by a portion of said first and second particular ones of said plurality of instructions.

9. The data processor according to claim 6 wherein the improvement further comprises:
the instruction execution means for further responding to the execution of said first particular one of said plurality of instructions by generating control signals which operate the register means to provide a third unit of information, operate the computation means to calculate an address from an effective address portion of said first particular one of said plurality of instructions and by calculating said first location in the information storage means by adding a scaled first portion of said third unit of information to said address, wherein the scaled first portion is calculated according to an operand size specified in the first particular one of said plurality of instructions.

10. The data processor according to claim 9 wherein the improvement further comprises:
the instruction execution means for further responding to the execution of said first particular one of said plurality of instructions by operating the computation means to calculate a difference between the first and second units of information, calculate an interpolation fraction from a second portion of the third unit of information, calculate a product of the difference between the first and second units of information and the interpolation fraction and calculate a sum of the product of the difference between the first and second units of information and the interpolation fraction and the first unit of information.

11. A data processor for which executes each of a plurality of instructions comprising:
a plurality of registers;
first means for responding to a first one of said plurality of instructions by calculating an address from an effective address portion of the first one of said plurality of instructions;
second means for responding to the first one of said plurality of instructions by obtaining a first operand from one of said plurality of registers specified by a register portion of the first one of said plurality of instructions;
third means for responding to the first one of said plurality of instructions by obtaining a second operand from a first location in a memory, the first location being determined by using a first portion of the first operand as an offset with respect to the address;
fourth means for responding to the first one of said plurality of instructions by obtaining a third operand from a second location in the memory, the second location being adjacent to the first location;
fifth means for responding to the first one of said plurality of instructions by performing an interpolation operation upon the second and third operands,
sixth means for responding to a second one of said plurality of instructions by obtaining a user input of a first operand from one of said plurality of registers specified by a first register portion of said second of said plurality of instructions without obtaining the first operand from a location in the memory;
seventh means for responding to a second one of said plurality of instructions by obtaining a user input of a second operand from one of said plurality of registers specified by a second register portion of said second of said plurality of instructions without obtaining the second operand from a location in the memory; and
eighth means for responding to the second one of said plurality of instructions by performing an interpolation operation upon the first and second operands.

12. The data processor according to claim 11 further comprising:
ninth menas for responding to the first one of said plurality of instructions by selectively rounding the result of said interpolation operation under control of a rounding portion of said first one of said plurality of instructions.

13. The data processor according to claim 11 further comprising:
tenth means for responding to the first and second ones of said plurality of instructions by selectively rounding the result of said interpolation operation undercontrol of a rounding portion of said first and second ones of said plurality of instructions.

14. The data processor according to claim 11 wherein:
said interpolation operation is a linear interpolation which uses a second portion of the first operand to calculate an interpolation fraction.

* * * * *

UNITED STATES PATENT AND TRADEMARK OFFICE
CERTIFICATE OF CORRECTION

PATENT NO. : 5,170,475
DATED : Dec. 9, 1992
INVENTOR(S) : C. David Wright et al.

It is certified that error appears in the above-indentified patent and that said Letters Patent is hereby corrected as shown below:

On the title page, item [54] and column 1.
In the title, after "MEMORY-RESIDENT" insert --AND REGISTER-RESIDENT--.

In Column 10, line 44, change "menas" to --means--.

Signed and Sealed this

Sixteenth Day of July, 1996

Attest:

BRUCE LEHMAN

Attesting Officer     Commissioner of Patents and Trademarks